C. C. CREEK.
Cultivator.
No. 68,290. Patented Aug. 27, 1867.
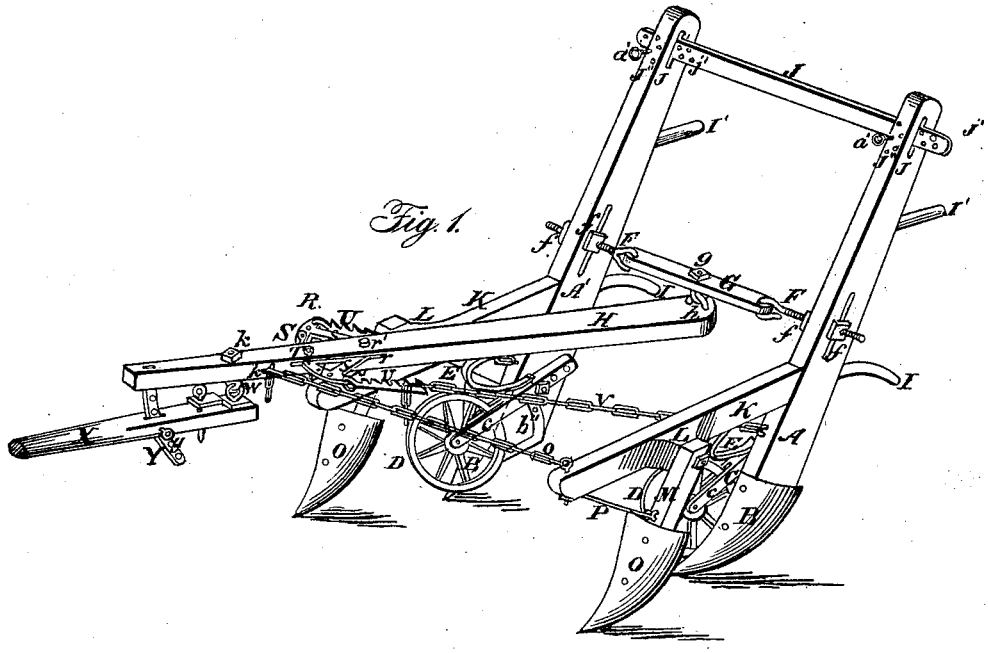
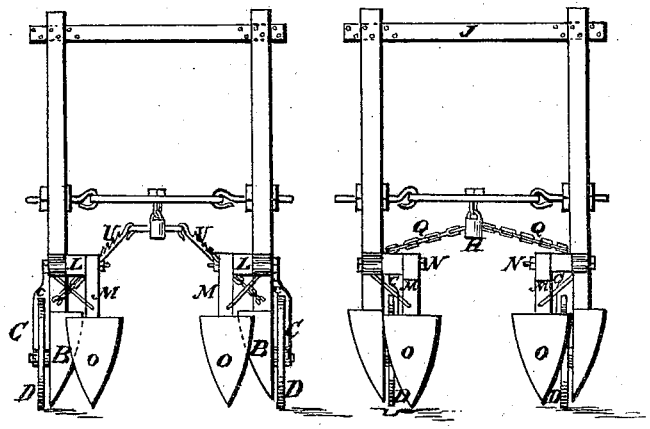 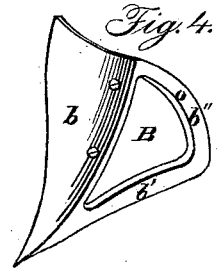
Witnesses:
Jas H Layman
Samuel Knight
Inventor:
C. C. Creek
By Knight Bros.
Attys

United States Patent Office.

CHARLES C. CREEK, OF LIBERTY, INDIANA.

Letters Patent No. 68,290, dated August 27, 1867.

---

IMPROVEMENT IN CULTIVATORS.

---

The Schedule referred to in these Letters Patent and making part of the same.

---

TO WHOM IT MAY CONCERN:

Be it known that I, CHARLES C. CREEK, of Liberty, Union county, Indiana, have invented a new and useful Cultivator; and I hereby declare the following to be a full, clear, and exact description thereof, reference being had to the accompanying drawings, making part of this specification.

My invention relates to a corn-plough or cultivator, for working corn or any crop needing cultivation when in a growing state, and is adapted to be drawn by two horses. In the accompanying drawings—

Figure 1 is a perspective view of a cultivator embodying my improvements.

Figures 2 and 3 are diagrams showing the same in altered forms, and

Figure 4 shows one of my plough-irons detached.

A A' are two posts or standards armed with peculiarly constructed plough-irons B B'. The plough-irons B B' are formed of a suitably curved plate, $b$, and a bar welded to the point and top of the same, having a ground-part, $b'$, and an upward ascending part, $b''$, and being furnished with suitable holes for attachment to the post A. Pivoted to the standards is an arm, C, having a slot, $c$, in which is journalled a wheel, D. The said wheel is intended to enter the ground very slightly if at all, its action being confined to that of a sifter to allow the fine dirt to fall through between the spokes around the roots of the young plants, but to prevent the clods or stones from rolling upon them. Attached to the standards A A' are springs E operating upon the arm C to keep the wheels D upon the ground. Passing through slots in the standards A A' are two screw-threaded hook-bolts F F, furnished with set-nuts $ff$, by which a lateral adjustability is secured. The hook-bolts F connect to each end respectively of a bar, G, and from the centre of this bar is jointed the rear end of the main beam H, by means of staples $h$ and hook-bolt $g$. The standards A A' are provided with handles I I and I' I', the former for raising the ploughs from the ground, and the latter for common use in guiding the implement. The standards A A' also have slots $j$ for the reception of an adjusting slat, J. The said slat is perforated with holes $j'$ and the standards with holes $j''$ for the reception of pins $a'$. Mortised into the standards A A' are side beams K, having upon their sides blocks L, to which the side standards M are attached by bolts N which pass through said standards, blocks, and beams. These side standards are armed with small shovel plough-shares O. A brace-rod, P, connects the standards M to the beams K. Chains Q connect the front ends of the beams K to hooks $k$ in the beam H. Within a slot, $r$, in the beam H, is a sectoral frame, R, and the said frame works upon a pivot-pin, $r'$. From the central or pivoted part the said frame has radial arms $s$ $s$ with a circumferential piece, S, perforated by vertical holes $t$ $t$ for the reception of pins T T, and of the hooked ends of two racks U U. The racks U U are for the purpose of furnishing an adjustable attachment for the brace-chains V V running from them to the standards A A'. Hinged to the beam, at W, is a tongue, X, and the said tongue admits of a vertical adjustment by means of a perforated flattened bar, Y, which passes through a slot in the tongue, and is retained to any desired position therein by means of a pin, $y$.

Some of the means of adjustment and modification in this cultivator are as follows:

The depth at which the ploughs B B' run can be regulated by means of the chains V V and racks U U. The two side sections of the cultivator admit of a lateral adjustment by means of the nuts $ff$, slat and pins J and $a'$, and chains Q and V on the racks U and hooks $k$. The end of the tongue admits of a vertical adjustment by means of the bar and pin Y and $y$, and also by means of the vertically adjustable bar G at the rear end of the beam. The said adjustment serves to regulate the depth at which the implement will penetrate the ground.

In fig. 2 is shown a modification in form, in which the two side sections are transposed—a form which would be found useful in many cases.

In fig. 3 is shown a modification, in which the small ploughs O with their blocks L are placed on opposite sides of the beams K to that shown in fig. 1.

I claim herein as new, and of my invention—

1. The provision in a corn-plough or cultivator of a sifter-wheel, D, constructed and attached substantially as shown and described.

2. I claim the plough-irons B B', having the element $b$ $b'$ $b''$, arranged as shown and described.

3. I claim the arrangement, in a corn-plough or cultivator, of the adjustable bar G with its bolt and nuts F $f$, substantially as set forth and for the purpose specified.

4. In combination with the adjusting-bar G F $f$, I claim the adjusting arrangement W Y $y$ of the tongue on the beam.

5. I claim the frame R, consisting of the elements S $s$ $t$, in combination with the racks U U and chains V V, admitting of a slight forward or retrograde movement in the ploughs B B' in respect to each other and the beam H.

In testimony of which invention I hereunto set my hand.

CHARLES C. CREEK.

Witnesses:
    GEO. H. KNIGHT,
    JAMES H. LAYMAN.